INVENTOR.
KURT HILLMAN
BY Joseph H. Roediger
ATTORNEY.

United States Patent Office 3,524,013
Patented Aug. 11, 1970

3,524,013
STABLE MONOCHROME BALANCE CIRCUIT FOR SINGLE GUN DISPLAY TUBE
Kurt Hillman, Flushing, N.Y., assignor to General Telephone & Electronics Laboratories Incorporated, a corporation of Delaware
Filed May 4, 1967, Ser. No. 636,213
Int. Cl. H04n 9/22
U.S. Cl. 178—5.4          9 Claims

ABSTRACT OF THE DISCLOSURE

A monochrome balance circuit for single gun color tubes is described in which the cathode, control grid, and screen grid voltages are varied sequentially by attenuating networks to compensate for the different efficiencies of the luminescent materials. The attenuating networks are controlled by digital switching signals to maintain the stability of the one gun tube.

BACKGROUND OF THE INVENTION

This invention relates to color television receivers containing single gun cathode ray tubes and more particularly to a stable monochrome balance circuit for use therewith.

Color television receivers employing a single electron beam to scan an image screen comprising successive groups or series of light emissive elements, the elements of each series being emissive of light of different primary colors in response to electron impingement, are now well known in the art. The image to be displayed is generated by presenting the red, green, and blue information sequentially. The rate at which color information is presented determines whether the system is dot, line or field sequential in its display.

Conventional three electron beam shadow mask display tubes present all three colors simultaneously rather than sequentially. However, the single beam color display tube has several advantages including its stability with respect to monnchrome balance and grey scale tracking that are not present in three beam display tubes. The term monochrome balance relates to the ability of a display tube to portray a natural hue at a given luminance level, for example a system white having a color temperature of approximately 6500° K. while grey scale tracking refers to the ability of the tube to display at natural hue for a number of luminance level signal, i.e. of different light intensity levels. The normal test signal for grey scale tracking is produced by scanning a grey scale chart which consists of a number of bars of equal width with the luminance increasing from bar to bar in uniform steps from the black level to the peak system white.

The three beam tube lacks these advantages due to the fact that the characteristics of the different electron guns are likely to vary in an independent manner during the operating life of the display tube. In the one electron beam display tube, any variation in the electron gun structure during the operating life affects the display of the different colors equally. However, the initial lack of monochrome balance due to the relative efficiencies of the different luminescent materials is readily compensated for in a three gun tube by an initial adjustment of the corresponding electron guns. This is not the case with single gun tubes.

The manufacturer of a single gun color tube can achieve monochrome balance by controlling the screening process during the fabrication of the tube. The difference efficiencies of the luminescent materials make this a difficult task and are apt to result in a high rejection rate of tubes since a departure from monochrome balance, particularly white, is readily noticed by a viewer. While the addition of a correction to one or more grids of the single gun tube provides monochrome balance at a particular luminance level, the correction alters the dynamic characteristics of the tube so that this balance is not present at other luminance levels.

The modification of the amplitude of the video drive signal or its components, the color difference and luminance signals, in single gun tubes has been proposed. The approach taken utilizes nonlinear signal processing circuits employing active elements. Typically, a gain control signal at the desired frequency is phase controlled and modulated by the luminance signal. In addition, a gain control device is provided for adjustment of the amplitude of the modulating luminance signal. The derived compensating signal is added to the color writing signal. However, these methods of obtaining balance and tracking utilize components which are subject to gain and phase variations, as well as changes in D-C bias levels during continued operation. This, in effect, results in a loss of monochrome balance and grey scale tracking and introduces an uncontrolled variable into the system which significantly impairs the inherent stability of a one gun cathode ray tube.

SUMMARY OF THE INVENTION

The present invention relates to a stable monochrome balance circuit for single gun cathode ray tubes which does not significantly affect the inherent stability of a one gun tube. The balance circuit operates in a digital manner to vary the screen grid voltage, the control grid voltage and the amplitude of the video drive signal in synchronism with the color being displayed.

A color television receiver utilizing a sequentially operated one gun tube comprises a conventoinal receiver by which the component signals of the received composite color signal are derived, a sequential decoder which processes the color reference and chrominance signals from the receiver circuit, horizontal and vertical scan generators which cause the electron beam to scan the image screen of the tube in accordance with synchronizing signals from the receiver, and means for applying the luminance signal from the receiver circuit to the tube.

The cathode ray tube contains cathode, control and screen grid electrodes. Generally, the color difference output signal of the sequential decoder is coupled to the control grid and the luminance signal is coupled to the cathode of the tube. The video drive signal is therefore developed between the control grid and the cathode. The screen grid is coupled to a positive voltage source.

The present invention varies the screen grid voltage, the control grid voltage and the video drive signal in synchronism with the color being displayed at the image screen grid is coupled to a positive voltage source. incorporating digitally operated first, second and third attenuator networks in the screen grid, control and cathode electrode circuits respectively. Each of the attenuator networks is provided with first and second terminals. The second terminal is coupled to a particular electrode of the tube, while the first terminal is coupled to the corresponding voltage or signal source being attenuated. Each attenuator provides three attenuation levels, including zero. The networks utilize transistors which are either driven into saturation or cut-off so that the transistor parameters have little influence over the amount of attenuation introduced.

The transistors are to be switched at predetermined dot, line or field rates depending on the type of sequential operation desired. Accordingly, means for generating switching signals having digital waveforms is coupled to the attenuator networks. For line sequential operation, the switching signals for the attenuator switches are derived from the horizontal scan generator by coupling its output thereof to a ring counter. The output signals of the ring counter have digital waveforms and are supplied to the transistors of the attenuator networks. These signals determine the rate at which the networks are switched between the attenuation levels.

The attenuator switching networks each contain first and second terminals. A load resistor is coupled between the terminals. In addition, first and second shunt resistors are coupled to the second terminal. Each shunt resistor is coupled in series with a corresponding transistor. The control electrode of each transistor is coupled to the generating means which sequentially drives them into saturation at the sequential rate. The switching networks are not complex and exhibit the stability characteristic of a resistor. Consequently, the inherent stability for monochrome balance of the single beam display tube is not significantly impaired by the stability of the correction circuit. In addition, the relatively low number of components and the lack of complexity render the present invention suitable for use in a commercial television receiver.

Further features and advantages of the invention will become more readily apparent from the following detailed description of a specific embodiment when taken in conjunction with the accompanying drawings.

DESCRIPTION OF THE PREFERRED EMBODIMENT

Figure 1:
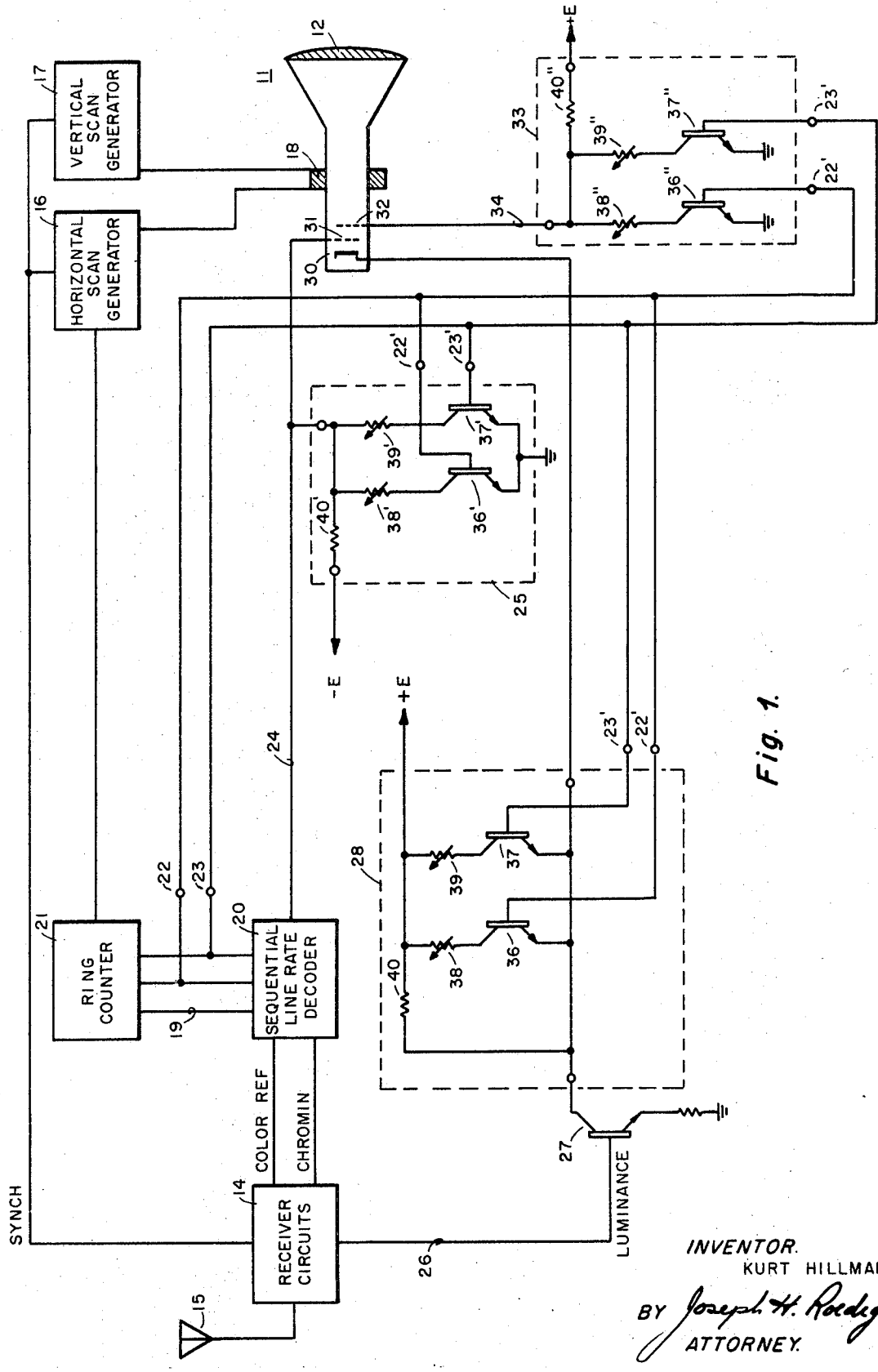
FIG. 1 is a block schematic diagram of one embodiment of the invention.

Referring now to FIG. 1, there is shown a color television receiver employing a single gun cathode ray tube 11. The faceplate 12 of the tube is provided with light emissive materials, normally red, green and blue phosphors disposed in a vertical stripe configuration. The tube may be of the index-signal generating type or may incorporate switching grids proximate to the faceplate. Both types of cathode ray tubes are well known in the art and may be used interchangeably in the present invention.

The receiver circuits 14 are conventional circuits which receive the composite color signal from antenna 15 and derive the chrominance, luminance, synchronizing, and color reference signals therefrom. The synchronizing signals are supplied to horizontal and vertical scan signal generators 16 and 17 which supply the deflection currents to the yoke 18 of tube 11.

The color reference and chrominance signals provided by receiver circuits 14 are supplied to sequential decoder 20. The following description of sequential decoder 20 and the mode of operation of the receiver is with reference to a line sequential rather than dot or field sequential system. However, the invention can be employed with these systems as well. By line sequential is meant that during one complete horizontal line scan, only information corresponding to a single color is supplied to the electrodes of tube 11. One type of line sequential decoder is described in an article in "Electronics," May 31, 1965, on pages 81–85.

The decoder normally contains a band pass amplifier that passes only the 3.58 mc. chrominance signal and the 0.5 mc. sidebands on either side of the suppressed subcarrier. The luminance component is filtered out. In the decoder, the chrominance signal is demodulated by a synchronous detector to which a local sub carrier is applied. The phase of the local subcarrier is shifted by 120° at the start of each horizontal line scan so that the particular color difference signal to be displayed is provided at the decoder output.

Figure 2:
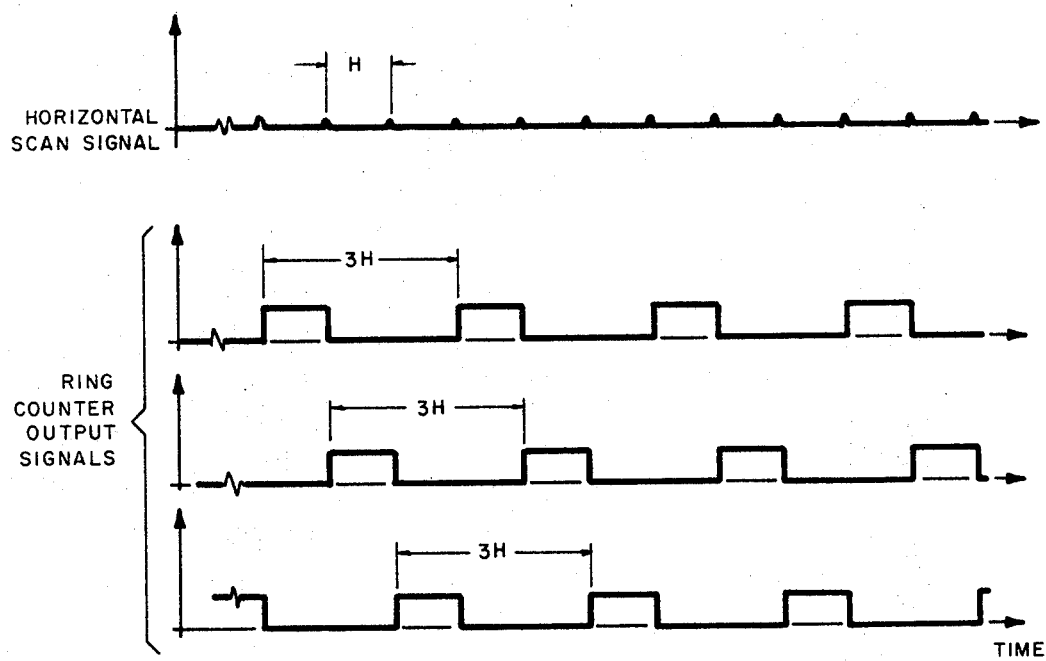
FIG. 2 shows representative waveforms occurring at different points in the embodiment of FIG. 1.

The shifting of the phase of the local subcarrier signal is controlled by the horizontal scan signal. To this end, the horizontal scan generator 16 is coupled to generating means 21, typically a ring counter, which provides three output signals. The signal waveforms of these output signals are shown in FIG. 2. In addition, the horizontal scan signal is shown comprised of narrow pulses at the horizontal line rate of 15.735 mcs. The period between pulses is shown as H. The narrow pulses are counted in ring counter 21 which provides three pulse output signals each of which has a pulse duration H and a period between the leading edges of successive signals of 3H. As shown, the pulses are displaced in time relative to each other by the interval H and provide the timing for the 120° phase shifts of the local subcarrier signal in decoder 20. Consequently, each of the ring counter output waveforms correspond to the line scan of a single color on faceplate 12.

The colod difference signals from the sequential line rate decoder 20 are coupled via output connection 24 to control grid 31 of tube 11. The luminance signal Y is coupled from the receiver circuits 14 via connection 26, amplifier 27 and cathode attenuator 28 to the cathode 30 of tube 11. As a result, the color difference signals, $G-Y$, $R-Y$, and $B-Y$, are added to the luminance signal Y in tube 11 to provide the video drive signal between the control grid and cathode. The screen grid 32 is coupled to a positive voltage source $+E$ via connection 34 and screen grid attenuator 33. The control grid bias source $-E$ is coupled via control grid attenuator network 25 to control grid 31.

Assuming that attenuators 25, 28 and 33 are inoperative, the color difference signals are sequentially applied to the control grid 31 of the tube for periods corresponding to the line scan interval. The luminance signal Y is added thereto in the tube. However, the intensity of the light emitted from the face plate 12 is not determined only by the magnitude of the resultant video drive signal for particular control grid and screen grid voltages, but also by the difference in efficiency of the phosphor materials on the faceplate. Consequently, it is necessary to provide correction signals to the electrodes of tube 11 in order to obtain monochrome balance and grey scale tracking during operation.

Figure 3:
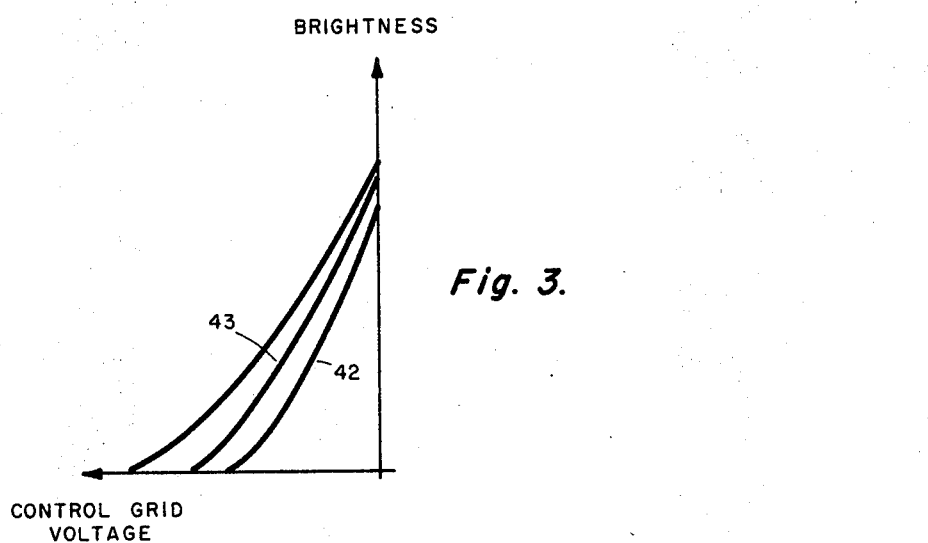
FIG. 3 is a curve showing the relationship between control grid voltage and brightness for a typical display tube.

While a variation in the screen grid voltage 32 provides an approximate correction by altering the tube characteristics at a particular luminance level to achieve a point of monochrome balance, the dynamic or operating characteristics of the tube are varied as shown in FIG. 3 wherein the grid-bases for the different phosphor curves are no longer the same. As a result, grey-scale tracking is not present. In order to achieve both monochrome balance and grey scale tracking, it has been found necessary to both vary the control grid and screen grid voltages in accordance with the phosphor efficiencies and, at the same time, vary the magnitude of the video drive signal.

The single gun cathode ray tube is essentially unaffected by the unbalancing due to aging experienced in multiple gun tubes. This stability is due to the fact that any variations in the electron gun or tube will be experienced equally by all three color signals. To preserve this inherent stability, it is necessary that the correction means used to obtain monochrome balance and grey scale tracking be stable during continued operation.

The use of stable attenuator networks 25, 28 and 33 in the control grid, cathode and screen grid circuits respectively provides the desired corrections without altering the stability of the gun tube. Each attenuator can provide three different levers of attenuation, including zero attenuation, in the corresponding electrode circuit. As shown, an attenuator is comprised of resistors and switching transistors. In operation, the transistors are either driven into saturation or are cut-off. Thus, the attenuators are essentially unaffected by any variation in their dynamic characteristics and possess the stability characteristic of resistors.

The terminals 22' and 23' of the attenuating networks are coupled to terminals 22 and 23 of ring counter 21. Thus, the sequential operation of the attenuators is controlled by the digital signals from the ring counter. At the time that the least efficient phopshor on faceplate 12 is being excited, an output waveform is coupled to decoder 20 via connection 19 and no signal is present at terminals 22 and 23. Thus, the transistors are cut-off and the attenuating networks introduce essentially no attenuation into the electrode circuits. At the time, the predominant or most efficient phosphor is to be displayed, the ring counter output signal appears at terminal 22 and drives transistors 36, 36' and 36" into saturation whereby a predetermined amount of attenuation is introduced into the cathode, control grid and screen grid circuits. Similarly, during the interval that the phosphor of intermediate efficiency is being displayed, transistors 37, 37' and 37" are driven into saturation by the ring counter output appearing at terminal 23.

Each attenuator network includes first and second terminals. The second terminal is coupled to the appropriate grid while the first terminal is coupled to the voltage or signal source to be attenuated. Load resistors 40, 40' and 40" are coupled between the second terminal and a reference potential. In addition, first and second shunt conducting paths are coupled between the second terminal and a reference potential. The conducting paths contain variable resistors 38, 38' and 38", 39, 39' and 39" and transistors 36, 36' and 36" and 37, 37' and 37". The base electrodes of the transistors are coupled to a corresponding terminal 22', 23'.

In the case of the screen grid attenuator network 33, resistor 40" is coupled between screen grid voltage source +E and screen grid 32. For the control grid circuit, the load resistor 40' is coupled between the control grid voltage source —E and the control grid 31. As shown, the cathode attenuator network 28 is coupled between the video amplifier 27 and the video drive control to provide a variation in the luminance signal.

In practice, the attenuator 333 is adajusted by setting its resistors 38" and 39" so that a system white is displayed at the corresponding high luminance level. If the initial departure from the monochrome balance condition is not too severe, the cathode and control grid attenuator networks 25 and 28 need not be employed. However, the use of all three networks is desirable since the introduction of a significant correction to obtain a monochrome balance at the standard white results in the inability of the receiver to display neutral hues at low luminance levels and to provide grey scale tracking.

The next step of adjustment is the variation of the magnitudes of resistors 38' and 39' of attenuator 25 to vary the grid base of the display tube 11 so that a low luminance level neutral hue, i.e. a near black, can be displayed. The correction of the screen grid voltage by attenuator 33 changes the tube characteristics for each phosphor as shown in FIG. 3. Accordingly, the black level must be adjusted by varying the grid bases corresponding to the three curves in FIG. 3. This is provided by the attenuation of the control grid bias voltage. The attenuation is set to be greatest during the interval that the most efficient phosphor, shown by curve 42, is being scanned. A lesser amount of attenuation is required to correct the phosphor of curve 43. At this point, monochrome balance is provided at points near the extremes of the grey-scale.

To provide tracking throughout the grey-scale, the attenuator network 28 is adjusted by varying the magnitudes of its resistors 38 and 39. This requires that the luminance signal, during the time that the most efficient phosphor is displayed, experience the largest amount of attenuation. Thus, the video drive signal is modified over its dynamic range and the tracking can be maintained over the entire standard grey-scale test range.

While the above description has referred to a specific embodiment of the invention, it is apparent that many modifications and variations may be made therein without departing from the spirit and scope of the invention.

What is claimed is:

1. Apparatus for compensating for the different efficiencies of first and second luminescent materials in a color display tube of the type wherein the image to be displayed is generated by sequentially modulating an electron beam with color information at a predetermined sequential rate, said display tube including cathode, control grid and screen grid electrodes, comprising
    (a) generating means for producing first and second output switching signals at said sequential rate, said switching signals corresponding to first and second colors in said color information, and
    (b) a first attenuator network coupled between an electrode of said display tube and a reference potential, said network being further coupled to said generating means to receive said first and second output signals, each of said first and second output signals being independently attenuated by said attenuator network and applied sequentially to said electrode to compensate for the different efficiencies of said first and second luminescent materials.

2. Apparatus in accordance with claim 1 in which said attenuator network contains first and second terminals and comprises
    (a) a load resistor coupled between said first and second terminals,
    (b) first and second conducting paths coupled between said second terminal and a reference potential, each of said conducting paths comprising a resistor and a transistor having base, emitter and collector electrodes, said collector and emitter electrodes being coupled to said resistor and reference potential respectively, the base electrodes of said transistors being coupled to said generating means, said generating means rendering said transistors conductive at said sequential rate.

3. Apparatus in accordance with claim 1 wherein the electrode of said first attenuator network is coupled to the screen grid of said display tube and which further comprises
    (a) a second attenuator network coupled between the control grid circuit of said display tube and a reference potential, and
    (b) a third attenuator network coupled between the cathode circuit of said display tube and a reference potential, said second and third networks being further coupled to generating means to receive said first and second output signals, each of said first and second output signals being independently attenuated by said attenuator networks and applied sequentially to said electrode to compensate for the different efficiencies of said first and second luminescent materials.

4. Apparatus in accordance with claim 3 in which said first, second and third attenuator networks have three attenuation levels, said networks being switched between attenuation levels by said generating means at said sequential rate.

5. Apparatus in accordance with claim 4 in which each of said attenuator networks comprises
    (a) first and second conducting paths, each of said conducting paths comprising a resistor and a transistor having base, emitter and collector electrodes, one terminal of said resistor being coupled to said collector electrode, the other terminal of said resistor being coupled to the like resistor terminal in said other conducting path, said emitter electrodes being coupled together, and
    (b) a load resistor coupled between the junction of said resistors and the junction of said emitter electrodes.

6. Apparatus in accordance with claim 5 in which said means generates switching signals at the horizontal scan frequency, said signals having a digital waveform and duration equal to the interval between successive horizontal scan signals.

7. Apparatus in accordance with claim 6 in which said generating means comprises a ring counter having three output terminals, said counter providing switching signals at the horizontal scan frequency sequentially at said three output terminals, two of said three terminals being coupled to each of said attenuator networks whereby the attenuation in each of said electrode circuits is varied at the horizontal scan rate.

8. A color television receiver comprising
   (a) a single gun cathode ray tube having successive groups of light emissive materials disposed on the faceplate thereof, said materials emitting light of different colors when excited by an electron beam at a predetermined sequential rate, said tube containing screen grid, control grid and cathode electrodes;
   (b) a receiver for deriving the component signals of the received composite color signal, said component signals including the color reference, chrominance and luminance signals;
   (c) means for generating switching signals at said sequential rate;
   (d) a sequential decoder coupled to said generating means and to said receiver, said decoder processing the color reference and chrominance signals from said receiver, the output of said decoder being supplied to the control grid of said tube;
   (e) means for coupling the luminance signal from said receiver to the cathode of said tube; and
   (f) a first attenuator network having first and second terminals, said first terminal being coupled to the screen grid of said tube, said second terminal being coupled to a voltage source, said network having three attenuation levels, said network being coupled to said generating means whereby the attenuation in the screen grid circuit is varied between said levels at the sequential rate to compensate for the different efficiencies of the luminescent materials in said tube.

9. A color television receiver in accordance with claim 8 further comprising
   (a) a second attenuator network having first and second terminals, said first terminal being coupled to the control grid of said tube, said second terminal being coupled to a voltage source, said network having three attenuation levels, said network being coupled to said generating means whereby the attenuation in the control grid circuit is varied between said levels at the sequential rate, and
   (b) a third attenuator network having first and second terminals, said first terminal being coupled to the cathode of said tube, said second terminal being coupled to said means for coupling the luminance signal, said network having three attenuation levels, said network being coupled to said generating means whereby the attenuation in the cathode circuit is varied between said levels at the sequential rate.

References Cited

UNITED STATES PATENTS

| | | | |
|---|---|---|---|
| 2,790,847 | 4/1957 | Houghton | 178—5.4 |
| 2,845,573 | 7/1958 | Macovski | 315—13 |
| 2,887,528 | 5/1959 | Rhodes | 178—5.4 |
| 3,213,190 | 10/1965 | Mutschler | 178—5.4 |

ROBERT L. GRIFFIN, Primary Examiner

R. L. RICHARDSON, Assistant Examiner

U.S. Cl. X.R.

315—22